(12) United States Patent
Ledet

(10) Patent No.: US 8,280,780 B1
(45) Date of Patent: Oct. 2, 2012

(54) SYSTEM, METHOD, AND COMPUTER-READABLE MEDIUM FOR AUTOMATIC QUERY AND ORDER PROCESSING VIA THE INTERNET

(75) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

(21) Appl. No.: 12/505,109

(22) Filed: Jul. 17, 2009

(51) Int. Cl.
*G06Q 30/00* (2006.01)

(52) U.S. Cl. .................................................. 705/26.61

(58) Field of Classification Search .................. 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | | |
|---|---|---|---|---|
| 5,758,328 A | * | 5/1998 | Giovannoli | 705/26 |
| 7,788,212 B2 | * | 8/2010 | Beckmann et al. | 707/622 |
| 2003/0033164 A1 | * | 2/2003 | Faltings et al. | 705/1 |
| 2005/0108107 A1 | * | 5/2005 | Grayson et al. | 705/26 |
| 2007/0100877 A1 | | 5/2007 | Paoli et al. | |
| 2007/0288662 A1 | * | 12/2007 | Chen | 709/247 |

OTHER PUBLICATIONS

D. Chamberlin, "XQuery: An XML query language" IBM Systems Journal, vol. 41, No. 4, 2002, pp. 597-615.*

* cited by examiner

*Primary Examiner* — Naeem Haq
(74) *Attorney, Agent, or Firm* — Haynes and Boone, LLP

(57) ABSTRACT

A system, method, and computer readable medium for facilitating user interaction with numerous product suppliers to determine which supplier to utilize for ordering a product based on various parameters are provided. A user may interact with one or more suppliers using similar or different parameters for each supplier within the same application without having to switch to another external application. Results are provided in a visually appealing and logical manner and automate the ordering of an item if that item is found at a particular supplier within predefined thresholds specified by the user. In this manner, orders may be submitted at the moment order thresholds are met, and decisions may be made automatically by one or more of the system, the user, or on an interaction by the user and another individual.

14 Claims, 10 Drawing Sheets

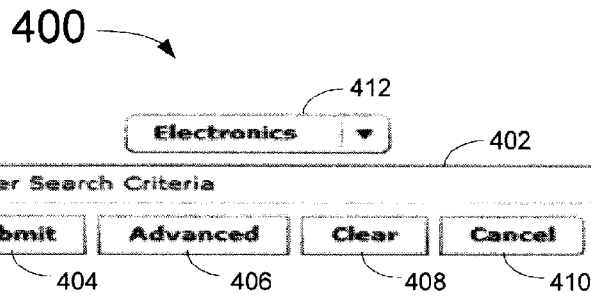
Figure 4A
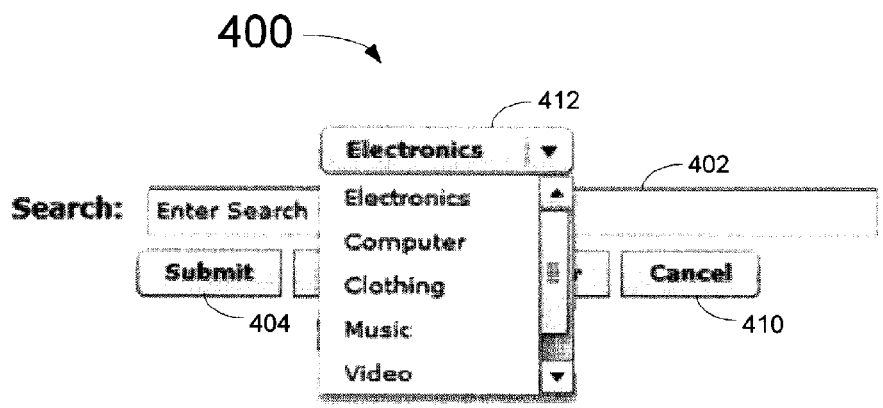
Figure 4B
Figure 5

```
//namespace
using com_webservices_amazon

AWSECommerceService aws = new AWSECommerceService();
ItemSearchRequest request = new ItemSearchRequest();

request.SearchIndex = "Electronics"; —— 602
request.Power = "title:" + DescriptionTextBox.Text;
request.ResponseGroup = new string[] { "Small" };
request.Sort = "salesrank"; —— 604

ItemSearchRequest[] requests = new ItemSearchRequest[] { request };

ItemSearch itemSearch = new ItemSearch();
itemSearch.AssociateTag = "myassociatetag-20";
itemSearch.SubscriptionId = "XXXXXXXXXXXXXXXX";
itemSearch.Request = requests;

try
{
 ItemSearchResponse response = aws.ItemSearch(itemSearch);
 Items info = response.Items[0];
 Item[] items = info.Item;
 Label1.Text = "";
 for (int i = 0; i < items.Length; i++)
 {
    Item item = items[i];
    Label1.Text += "Book Title: " + item.ItemAttributes.Title + "<br />";
 }
}
catch (Exception ex)
{
 Label1.Text = (ex.ToString());
```

```
Automatic Order Parameters
Set the throttle to enable automatic ordering
1002─ Price      [ less than    |▼]  [ $1.99              ]  ─1004
1006─ Quantity   [ greater than |▼]  [ 1000               ]  ─1008
1010─ Shipping   [ less than    |▼]  [ 4 ]  [ days    |▼]  ─1014
                        [ Submit ]  [ Cancel ]
```

Order Verification

| | |
|---:|:---|
| Supplier: | Central Parts |
| Item Description: | Spark Plug 4A3BGV2 |
| Price: | $1.99 |
| Shipping: | 4 Days |
| Quantity: | 1000 |

1102─[ Submit ]  [ Cancel ]─1104

FIG. 11

SYSTEM, METHOD, AND COMPUTER-READABLE MEDIUM FOR AUTOMATIC QUERY AND ORDER PROCESSING VIA THE INTERNET

FIELD OF THE INVENTION

The present invention is generally related to network technologies and, more particularly, to mechanisms for processing product orders via network systems.

BACKGROUND OF THE INVENTION

Various contemporary mechanisms exist that allow users to connect with companies via the Internet. For example, U.S. Pat. No. 6,125,391 to Meltzer, et al., describes a system that allows businesses to connect with potential customers. In the described system, XML based documents or schemas describe how two or more entities, such as a manufacturer and a supplier, communicate to initiate and conclude certain transactions for goods and/or services. A Business Information Document (BID) provides a common format that describes how the parties will communicate. Each of the entities interested in communicating via the Internet must adhere to the BID to ensure compliance with a process that must be agreed to ahead of time.

Microsoft Corporation has made significant investments for many years on business-to-business e-commerce applications. For example, Microsoft has defined an Application Integration Framework (AIF) that defines how data is exchanged. Also, in a related field, Microsoft has produced systems and methods for the design of electronic forms that pertain to visual elements and the creation of hierarchical schemas in creation of forms. However, no current applications exist that pertain to the interaction of remote websites and an application that is able to process data that has been entered into a form.

Various other patents, patent applications, and white papers relating to buyers and sellers and communications therebetween exist. For example, U.S. Pat. No. 6,976,006 to Verma, et al., describes a method and apparatus designed to facilitate price comparison via a buyer and that is presented to the buyer via the World Wide Web. U.S. Pat. No. 5,592,375 to Salmon, et al., describes a computer-implemented system of displaying products to potential sellers via the World Wide Web thereby allowing the user to select and review the product description. U.S. Patent Application Publication No. 2007/0130044 to Rowan, et al., describes a system that takes in a buyer's requirements and immediately constructs options specific to the buyer's needs based on broader inputs from any number of sellers. Any of these options can then be purchased immediately.

While these documents address connecting buyers with sellers, none of the cited references address communications between a buyer and seller once the seller has sent responses to the buyer or address a process whereby a user can enter values and wherein an item can be automatically ordered if the results from the seller fall within the values.

Therefore, what is needed is a mechanism that overcomes the described problems and limitations.

SUMMARY OF THE INVENTION

The present invention provides a system, method, and computer readable medium that provide mechanisms to enable a user to interact with numerous product suppliers to determine which supplier to utilize for ordering a product based on various parameters, and in situations where product query results are incomplete. A user may interact with one or more suppliers using similar or different parameters for each supplier within the same application without having to switch to another external application. Results are provided in a visually appealing and logical manner and automate the ordering of an item if that item is found at a particular supplier within predefined thresholds specified by the user. In this manner, orders may be submitted at the moment order thresholds are met, and decisions may be made automatically by one or more of the system, the user, or on an interaction by the user and another individual.

In one embodiment of the disclosure, a method of processing product queries in a network system is provided. The method includes providing a graphical user interface at a client data processing system, entering, by a user of the client data processing system, parameters associated with a product desired to be ordered by the user in the graphical user interface, issuing, by the client data processing system, a query to a plurality of data processing systems of respective product suppliers, wherein the query is derived from the parameters entered by the user, receiving, by the client data processing system, results of the query issued by the plurality of supplier data processing systems, and organizing, by the client data processing system, the results according to results satisfying the parameters.

In a further embodiment of the disclosure, a computer-readable medium having computer-executable instructions for execution by a processing system, the computer-executable instructions for processing product queries in a network system, is provided. The instructions, when executed by the processing system, cause the processing system to provide a graphical user interface at a client data processing system, receive parameters associated with a product desired to be ordered by a user in the graphical user interface, wherein at least one or more of the parameters includes a respective equality condition associated therewith, issue, by the client data processing system, a query to a plurality of data processing systems of respective product suppliers, wherein the query is derived from the parameters, receive, by the client data processing system, results of the query issued by the plurality of supplier data processing systems, and organize, by the client data processing system, the results according to results satisfying the parameters.

In a further embodiment of the disclosure, a system for processing product queries is provided. The system includes a network system, a client data processing system communicatively coupled with the network system, and a plurality of product supplier data processing system communicatively coupled with the network system. The client data processing system provides a graphical user interface for entry of parameters associated with a product desired to be ordered, wherein at least one or more of the parameters includes a respective equality condition associated therewith. The client data processing system issues a query to the plurality of product supplier data processing systems that is derived from the parameters entered, receives results of the query issued by the plurality of supplier data processing systems, and organizes the results according to results satisfying the parameters.

BRIEF DESCRIPTION OF THE DRAWINGS

Aspects of the present disclosure are best understood from the following detailed description when read with the accompanying figures, in which:

FIG. 4A is a diagrammatic representation of a Graphical User Interface window that facilitates product order processing in accordance with disclosed embodiments;

FIG. 4B depicts a diagrammatic representation of the Graphical User Interface window of FIG. 4A in which a dropdown list of categories are presented for selection to the user in response to the user selecting a dropdown menu control in accordance with embodiments;

FIG. 5 depicts a diagrammatic representation of an advanced search window that may be provided to a user in accordance with an embodiment;

FIG. 6 depicts a sample code utilized to query an item in accordance with an embodiment;

FIG. 10A depicts a diagrammatic representation of a product order Graphical User Interface that facilitates automated ordering of desired products implemented in accordance with disclosed embodiments;

FIG. 10B depicts a diagrammatic representation of a product order Graphical User Interface with menu items of a price drop down menu displayed responsive to the user selecting the price drop down menu in accordance with an embodiment;

FIG. 10C depicts a diagrammatic representation of a product order Graphical User Interface with menu items of a time unit drop down menu displayed responsive to a user selecting a time unit drop down menu in accordance with an embodiment;

FIG. 10D depicts a diagrammatic representation of a product order Graphical User Interface after entry of a product price and corresponding constraints in accordance with an embodiment; and FIG. 11 depicts a diagrammatic representation of an automatic product order verification popup window that may be displayed to a user in accordance with an embodiment.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Various developments have been made on business-to-business e-commerce applications. An Application Integration Framework (AIF) has been introduced that defines how data is exchanged and formatted in XML. The AIF provides a format for exchanging data both internally within an organization, as well as externally with other entities. To facilitate integration with external systems, it has been recommended to utilize a Web Service. AIF includes support for Windows Communication Foundation (WCF) Web services that allow Microsoft Dynamics AX to exchange data with external systems. Current applications make integration between different entities easier but, however, do not assist a user in deeper integration once an initial communication has taken place. Further, the AIF must be adopted by all participants.

In accordance with disclosed embodiments, mechanisms are provided that facilitate querying for specific data from a user's input and processes surrounding the received results. The processes of the disclosed embodiments allow for easy communication with a remote entity to gather more details about missing data in the results, or to automatically place an order if one or more results fall within a predetermined range as described more fully hereinbelow.

Figure 1:
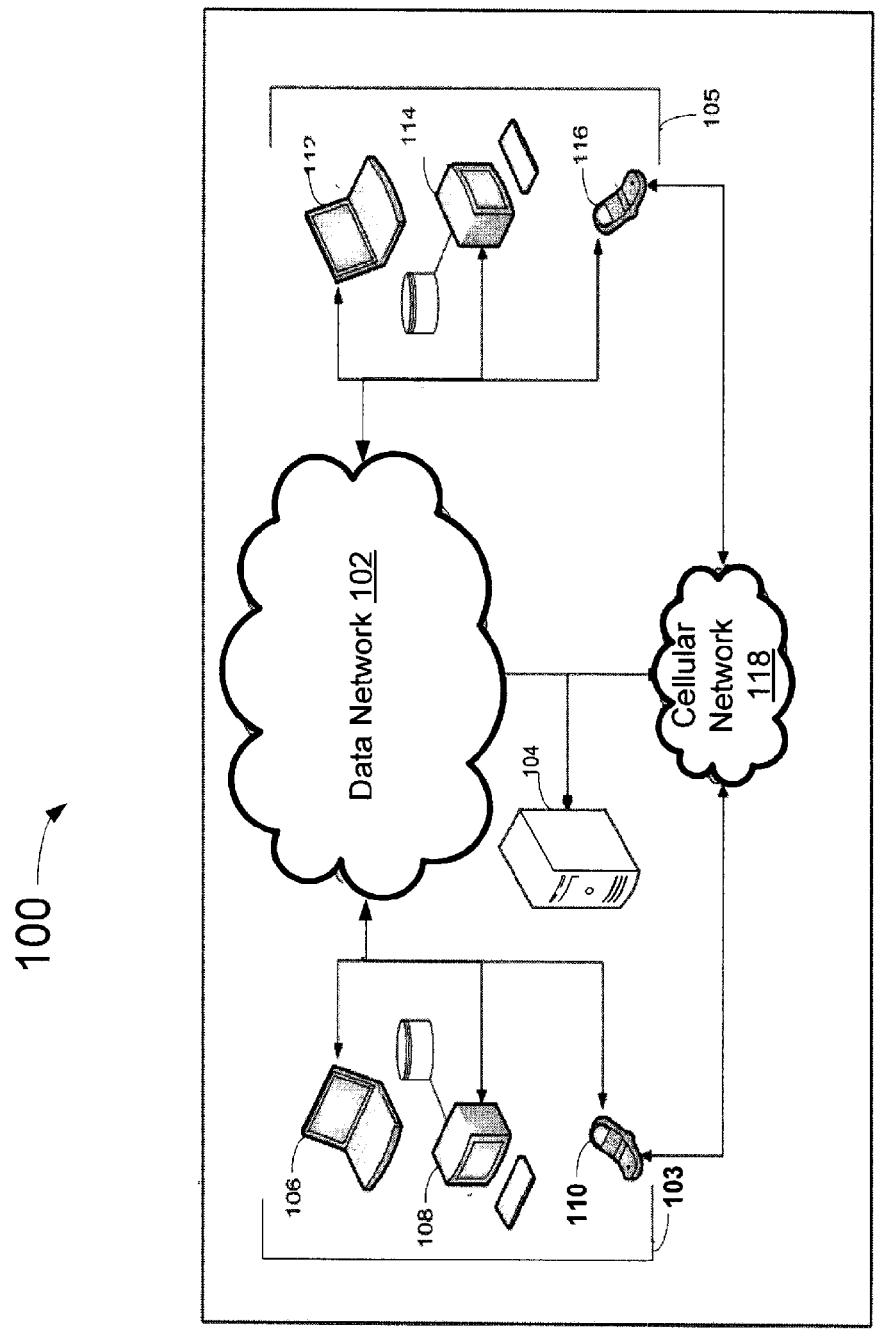
FIG. 1 is a diagrammatic representation of a network system that facilitates implementations of disclosed embodiments.

FIG. 1 is a diagrammatic representation of a network system 100 that facilitates implementation of disclosed embodiments. Network system 100 comprises a network of data processing systems in which embodiments disclosed herein may be implemented. Network system 100 includes a data network 102 that provides a medium used for communication links between various devices communicatively coupled together within network system 100. Network 102 may include connections, such as wire, wireless communication links, or fiber optic cables.

A client data processing system 103, such as a mobile laptop device 106, a personal desktop computer 108, a cellular device 110, or any other suitable data processing system adapted to communicatively interface with network 102, may be utilized for implementations of disclosed embodiments. Further, a server 104 is communicatively interfaced with network 102. In the event a client data processing system is implemented as a cellular device 110, the client data processing system may be communicatively coupled with network 102 via a cellular network 118 that is interfaced with network 102. An application implemented in accordance with the disclosed embodiments may be hosted by a data processing system, such as server 104, that is interfaced with network 102.

In accordance with disclosed embodiments, a user of a client data processing system may access a supplier data processing system 105. The supplier data processing system 105 may be implemented as, for example, a mobile laptop device 112, a personal desktop or server computer 114, or a cellular device 116. The supplier device 105 is communicatively coupled with the network 102. If the client data processing system 105 comprises a cellular device, the server 104 may be accessed via network 102 or, alternatively, the cellular network 118. It should be noted that the client and supplier devices depicted in FIG. 1 are exemplary only and are descried only to facilitate an understanding of the disclosed embodiments, and any variety of device types may be suitably substituted therefor. For example, a PDA, an MP3 player, a gaming device (such as a hand held system or home based system), and the like that may also transmit and receive information may be used in accordance with the disclosed embodiments.

In the depicted example, network 102 may comprise the Internet and thus comprises a worldwide collection of networks and gateways that use the Transmission Control Protocol/Internet Protocol (TCP/IP) suite of protocols to communicate with one another. To this end, network 102 comprises high-speed data communication lines between major nodes or host computers, comprising thousands of commercial, government, educational and other computer systems that route data and messages. Of course, network 102 also may be implemented as a number of different types of networks, such as, for example, an 808.11x network, a wide area network (WAN), or other suitable network implementation. FIG. 1 is intended as an example, and not as an architectural limitation for the disclosed embodiments.

Figure 2:
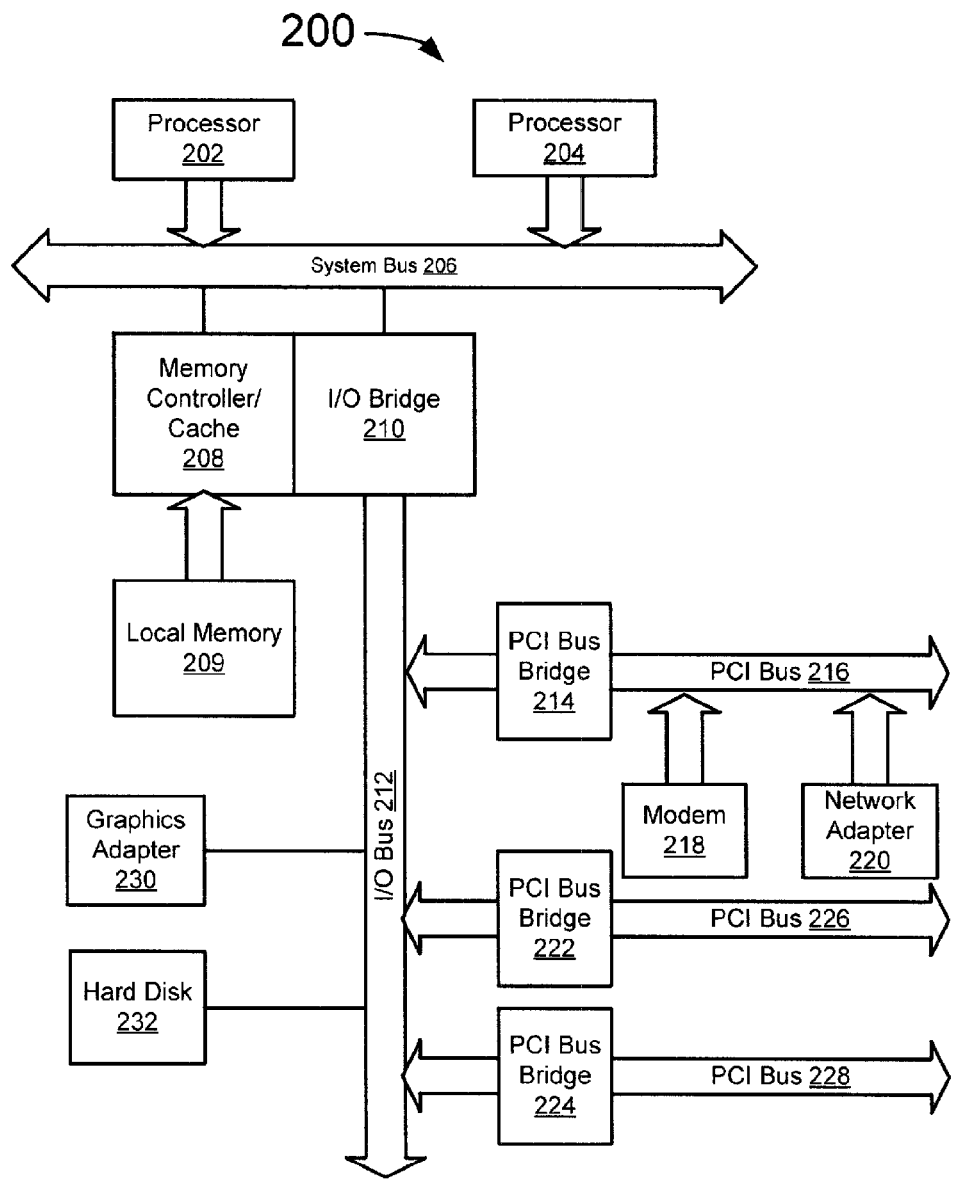
FIG. 2 depicts a diagrammatic representation of a data processing system that may be implemented as a server in accordance with an embodiment.

FIG. 2 depicts a diagrammatic representation of a data processing system 200 that may be implemented as a server, such as server 104 depicted in FIG. 1, implemented in accordance with an embodiment. Data processing system 200 may be a symmetric multiprocessor (SMP) system including a plurality of processors 202 and 204 connected to system bus 206. Alternatively, a single processor system may be employed. Also connected to system bus 206 is a memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Communications links to client systems may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 is exemplary only. The depicted example is not meant to imply architectural limitations with respect to the disclosed embodiments.

Figure 3:
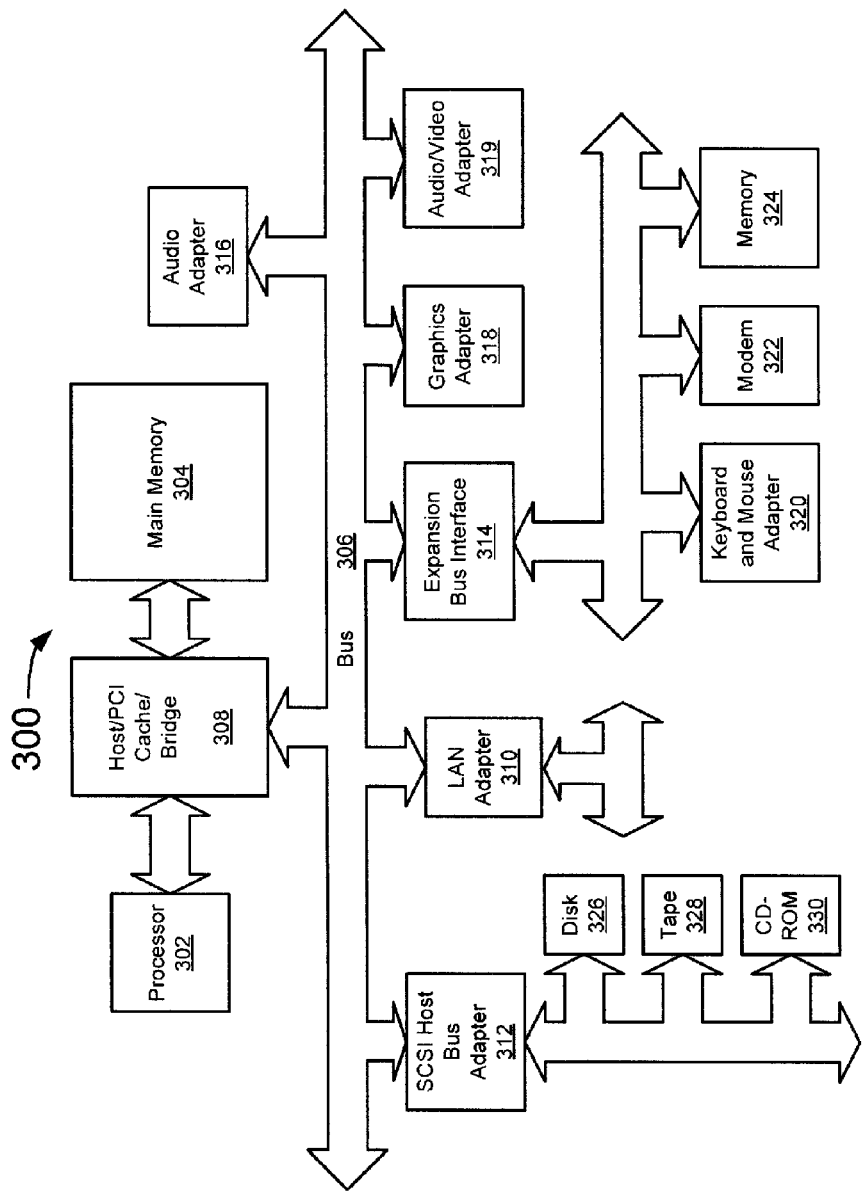
FIG. 3 depicts a diagrammatic representation of a client data processing system in which embodiments of the present disclosure may be implemented.

FIG. 3 depicts a diagrammatic representation of a client data processing system 300, such as desktop computer 108 depicted in FIG. 1, in which embodiments of the present disclosure may be implemented. In the illustrative example, data processing system 300 employs a peripheral component interconnect (PCI) local bus architecture although other bus architectures, such as Accelerated Graphics Port (AGP) and Industry Standard Architecture (ISA), may be suitably substituted therefor. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as a Windows operating system. Instructions for the operating system and applications or programs are located on storage devices, such as hard disk drive 326, and may be loaded into main memory 304 for execution by processor 302.

Those of ordinary skill in the art will appreciate that the hardware in FIG. 3 may vary depending on the implementation. The depicted example is not meant to imply architectural limitations with respect to the disclosed embodiments. For example, data processing system 300 also may be a notebook computer or hand held computer in addition to taking the form of a PDA, cellular device, or other suitable data processing system.

FIG. 4A is a diagrammatic representation of a Graphical User Interface (GUI) window 400 that facilitates product order processing in accordance with disclosed embodiments. The GUI window 400 is accessed via one or more of the client devices 103. The user may enter information into the GUI window 400 related to an item desired to search. The GUI window 400 includes a textbox 402 component in which the user may enter as much information as desired. GUI window 400 may include a variety of controls, such as a submit button 404, an advanced button 406, a clear button 408, and a cancel button 410. The user can select the submit button 404 to initiate a query with the contents of the textbox 402 to be used for the query. The user can select the advanced button 406 to enable the advanced window to be displayed as described more fully hereinbelow. The user can clear the contents of the textbox 402 by selecting the clear button 408. The user may cancel a search by selecting the cancel button 410 which may close the search window and return to a previous application window. GUI window 400 may include a dropdown menu 412 through which the user may select pre-defined categories available to limit the search by selecting a dropdown control if the user desires to do so.

FIG. 4B depicts a diagrammatic representation of the GUI window 400 in which a dropdown list of categories are presented for selection to the user in response to the user selecting the dropdown menu 412 control. The depicted categories of FIG. 4B are exemplary only.

FIG. 5 depicts a diagrammatic representation of an advanced search window 500 that may be provided to a user in accordance with an embodiment. The advanced search window 500 is displayed in response to the user selecting the advanced button 406 in the GUI window 400. The advanced search window 500 allows the user to enter specific input for various different attributes or parameters of a query.

In the depicted example, the advanced search window includes a description textbox 512, a details textbox 514, a price textbox 516, a quantity textbox 518, and a shipping textbox 520, although any variety of textboxes may be included in the advanced search window. For example, textboxes providing fields pertaining to Discounts, Recalls, Manufacturing or Operating Instructions, and the like may be included. Empty fields are an indication by the user that such information is not important. For example, a purchaser may want to understand prices or quantities of various items prior to making a purchase decision. As such, those fields may be left empty and all results would be provided to the user in an appropriate format to enable the user to make an informed decision.

The user may select the submit button 504 displayed in the advanced search window. Responsive thereto, the advanced search window may close and the contents of the individual textboxes are then used for the different parameters of the outgoing query message. The user may select the clear button 508 displayed in the advanced search window to clear all of the text input fields and may select the cancel button 510 displayed in the advanced search window to close out the search window and return to the previous window of the application.

Once a user submits the query, the application generates a query message. The query message is internal to the application and, in one embodiment, will not be altered by the user. The generated query message will utilize the Web Services that interact with the application according to disclosed embodiments. In another embodiment, users may alter the query message using available Web Services that allow the user to call specific objects on the Web Service with parameters and data provided by the user.

Implementations of disclosed embodiments may utilize knowledge of existing Web Services. Web services are based on standard protocols that serve to ensure that any Web service can be accessed by any client program, no matter what language the program is written in and no matter what platform the application is running on. Thus, for example, a client program written in Java may access and use a Web service written in VB.NET and that is deployed on a Windows server just as easily as a Windows program can use a Web service written in Java and running on a Linux Web server. Utilizing Web Services, a company may create and deploy on a server a set of services that any client can utilize to connect their client application with the server application. Since the Web Service uses a standard protocol, interworking the two separate applications is expedited. The published Web Services of each of the connecting companies will be utilized and interworking will be needed. The details of interworking with Web Services of various companies are known and well documented and thus will not be described in detail herein.

For the purposes of providing an example, the Amazon Web Service (version 4.0) will be used to describe certain functions. The Amazon Web Service is a widely utilized Web Service to query remote databases and is reflective of the published Web Services available today. In developing the client code to query the Amazon web site, various applications may be used that will interwork with the server Application Programming Interface (API). As an example, Microsoft's Visual Studio.NET is used. Once a new Web application is created, a Web reference to Amazon Web Services is added, and the address of the Web Services Description Language (WSDL) for the Amazon service is entered. Utilizing the GUI windows described hereinabove with reference to FIGS. 4A-5 to receive input from the user, the service to query the Amazon database is "connected" to the submit button, e.g., button 404 of FIGS. 4A and 4B or button 504 of FIG. 5, of the respective GUI window such that certain actions occur when the button is selected, e.g., "clicked-on" or otherwise accessed.

FIG. 6 depicts a sample code 600 utilized to query an item in accordance with an embodiment. The code 600 utilizes an ItemSearch object using a searchIndex="Electronics" 602 element to indicate that an item in the electronics category is being searched. Exemplary possible parameters available in the SearchIndex API are included in Table 1.

TABLE 1

| Parameter | Description |
| --- | --- |
| SearchIndex | The Amazon store from which products are desired. The list of available SearchIndex values, listed by locale, can be found on the search index values page. |
| Keywords | Used to refine the searched item based on specific words or phrases. Amazon E-Commerce Service (ECS) will match the included word or phrase in the request against various product fields, including product title, author, artist, description, manufacturer, etc. |
| Title | Used to query against product titles only. All or part of a title may be used in the query. |
| Power | Used to perform book searches using a complex query string. |
| BrowseNode | Used to narrow the search to a specific category of products in the Amazon catalog. The BrowseNode parameter may contain the ID of any Amazon browse node. For a list of Amazon browse nodes, please see Browse Node Values. |
| Artist | Used to refine a search by artist name. All or part of an artist's name may be used in the query. |
| Author | Used to refine a search by author name. All or part of an author's name may be used in a query. |
| Actor | Used to refine a search by actor name. All or part of an actor's name may be used in a query. |
| Director | Used to refine a search by Director name. All or part of a director's name may be used in a query. |
| AudienceRating | Used to filter movie product search results by the expected audience maturity level. Amazon.com values are based upon MPAA (Motion Picture Association of America) ratings. Amazon.de values are based upon age. One or more values may be specified in a comma-separated list in a REST request or using multiple elements in a SOAP request. |
| Manufacturer | Used to refine a search by manufacturer name. All or part of a manufacturer's name may be used in a query. |
| MusicLabel | Used to refine a search by the record label name. All or part of a record label's name may be used in a query. |
| Composer | Used to refine a search by composer name. All or part of a composer's name may be used in a query. |
| Publisher | Used to refine a search by publisher name. All or part of a publisher's name may be used in a query. |
| Brand | Used to refine a search by brand name. All or part of a brand's name may be used in a query. |
| Conductor | Used to refine a search by conductor name. All or part of a conductor's name may be used in a query. |
| Orchestra | Used to refine a search by orchestra name. All or part of an orchestra's name may be used in a query. |
| TextStream | Used to retrieve product search results based on a block of text specified in the request. The text block may be a search term, a paragraph from a blog, an article excerpt, or any other text for which it is desired to retrieve product matches. |
| ItemPage | Used to create a paginated list of search results. This parameter returns the specified page. When the ItemPage parameter is used, ItemSearch will return 10 search results at a time. The maximum ItemPage number that can be returned is 3200. If not used in the request, the first page (containing the first 10 items or all of the items if there are less than 10) will be returned by default. |
| Sort | Used to specify how search results will be ordered. Valid sort values vary by search index and locale. The full list of sort options is available in Sort Values. |
| City | Used to refine a search by city name. All or part of a city's name may be used in a query. |
| Cuisine | Used to refine a restaurant search by cuisine name (e.g., Chinese, Italian, American, etc.). |

TABLE 1-continued

| Parameter | Description |
| --- | --- |
| | All or part of a cuisine's name may be used in a query. This parameter may be used only when SearchIndex equals Restaurant and is only applicable to US requests. |
| Neighborhood | Used to refine a search by neighborhood name (e.g., Capitol Hill, Arlington, North Beach, etc.). All or part of a neighborhood's name may be used in a query. |
| MinimumPrice | Used to set a lower price bound on products returned by ItemSearch. |
| MaximumPrice | Used to set an upper price bound on products returned by ItemSearch. |
| MerchantId | Used to filter the list of offerings returned by ItemSearch by the merchant offering the product. |
| Condition | Used to filter the offers returned in the product list by condition type. By default, a request with the Condition parameter will return a maximum of 10 offers, with a maximum of 5 offer listings per offer. |
| DeliveryMethod | Used to filter offers returned in the product list by delivery method. Valid values are Ship and ISPU (In-store pickup). If ISPU is used, the offers returned will be ISPU offers from any postal code. To obtain ISPU offers from a specific postal code, the ItemLookup operation must be used. |
| ResponseGroup | Controls the data returned by the operation. Used to specify which response group(s), or group(s) of data elements, desired to be returned by ECS. |

Figure 7:
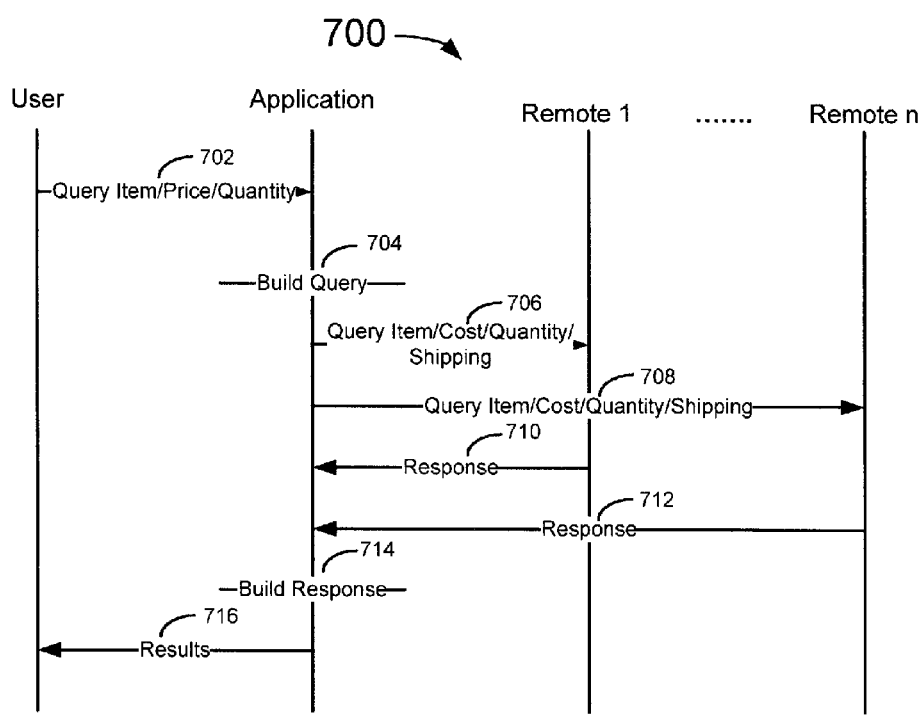
FIG. 7 depicts a diagrammatic representation of a message flow of an outgoing query and resultant response implemented in accordance with an embodiment.

FIG. 7 depicts a diagrammatic representation of a message flow 700 of an outgoing query and resultant response implemented in accordance with an embodiment. The particular format of the query message and the result may vary depending on various circumstances, and the discussion of the exemplary message flow 700 is provided only to facilitate an understanding of disclosed embodiments.

A user supplies various query input data to an application running at the client system (step 702), e.g., via data input through one or more GUI windows as depicted in FIGS. 4A-5. For example, the user may input a query item, desired price, and a desired quantity. The application that provides the GUI window then formulates a query based on the user input (step 704). The application then submits the generated query to one or more remote sites, e.g., vendor servers (steps 706 and 708). The application then awaits a response from the queried servers (steps 710 and 712). The application then builds a response from the results received from the queried vendor servers (step 714). The response is then returned to the client application for display to the user (step 716).

Figure 8A:
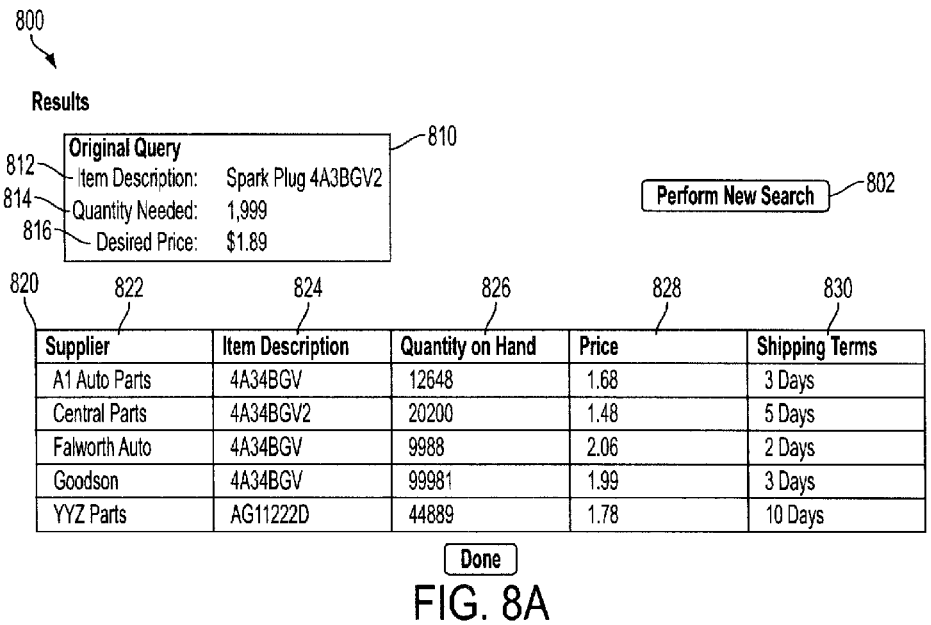
FIG. 8A depicts an exemplary result window for display of query results implemented in accordance with disclosed embodiments.

FIG. 8A depicts an exemplary result window 800 for display of query results implemented in accordance with disclosed embodiments. In the exemplary embodiment, the result window 800 includes a Perform New Search button 802 that, when selected, will result in a new query being performed based on the previous query results. In this instance, the current result window 800 may be closed or otherwise removed from the client system display, and the original search window is presented to the user. For example, if the user had originally used the simple, or basic, search window 400 to perform the query, then the GUI window 400 may then be displayed. The original search text that the user had entered will automatically be included in the search text area, e.g., in textbox 402. If the user had used the advanced search window 500 depicted in FIG. 5 to perform the query, then the advanced search window 500 may then be displayed. In this instance, each field of the advanced search window will be filled in with the advanced search query parameters specified by the user. The user will then have the ability to alter the fields to modify the query.

Upon reception of the results from the remote applications, the results are sorted and displayed to the user. The results window 800 may include a query pane 810 that displays characteristics of the query, e.g., an item description 812, a desired quantity 814, and a desired price 816. Further, a response table 820 displays results of the query. In the illustrative example, the results table includes a supplier column 822, an item description column 824, a quantity on hand column 826, a price column 828, and a shipping terms column 830.

In accordance with an embodiment, the results display is provided such that the closest matching results are displayed at the top of the response table 820. For example, if the user searched for a large quantity of a particular item and requires the desired items in a certain amount of time (e.g., 5 days), the response table 820 displayed to the user may place the closest matching results at the top of the table, followed by the results that next matched the query in descending order.

When searching remote inventories, the search application may prioritize the order in which an item can be found. For instance, the data in the item description column 824 is first searched. If the particular item is found, then the application may attempt to match a second criteria, for instance, the "Details" data, followed then by a third criteria, for instance, "Color". This process may continue to attempt to find as close a match, and as many matches, as possible.

When returning results from a query, the data returned is formatted into the results table 820 which is logically ordered and visually appealing to the user. This allows the user to obtain a quick understanding of the results from the previously submitted query. Each of the columns of the results table 820 in the result window 800 may be sorted. For instance, the user may select a heading of an individual column, and the selected column may be sorted in ascending order. If the user selects the heading of the column again, the results may be displayed in a descending order of the selected column.

Assuming that exact matches will at times not be found, the results that most closely match the search string are displayed to the user. For instance, if the "Item Description" and "Price" are matched, but the "Quantity on Hand" data is not, the results table 820 may contain the result with the matched columns and the closest approximation of the quantity available from the inventory for that item.

The sorting is performed through the values sent via the Web Service. For example, if the "ItemSearch" object is used in a Web Service, the "Sort" field of that object can be set to order the sorting of the resulting data returned from the Web Service call.

In accordance with disclosed embodiments, there are many possible parameters for sorting results according to what the user is searching for. For example, assume the user is searching for video games. Table 2 depicts possible sorting values that may be set for sorting the results of the query. The various sorting options are implemented in accordance with disclosed embodiments to facilitate the display of the results in the order desired by the user.

TABLE 2

| Value | Description |
| --- | --- |
| relevancerank | Items ranked according to the following criteria: how often the keyword appears in the description, where the keyword appears. For example, the ranking |

TABLE 2-continued

| Value | Description |
| --- | --- |
| | is higher when keywords are found in titles. And, if there are multiple keywords, how closely they occur in descriptions, and how often customers purchased the products they found using the keyword. |
| salesrank | Bestselling |
| price | Price: low to high |
| price | Price: high to low |
| titlerank | Alphabetical: A to Z |
| video-release-date | Release date: newer to older |

Figure 8B:
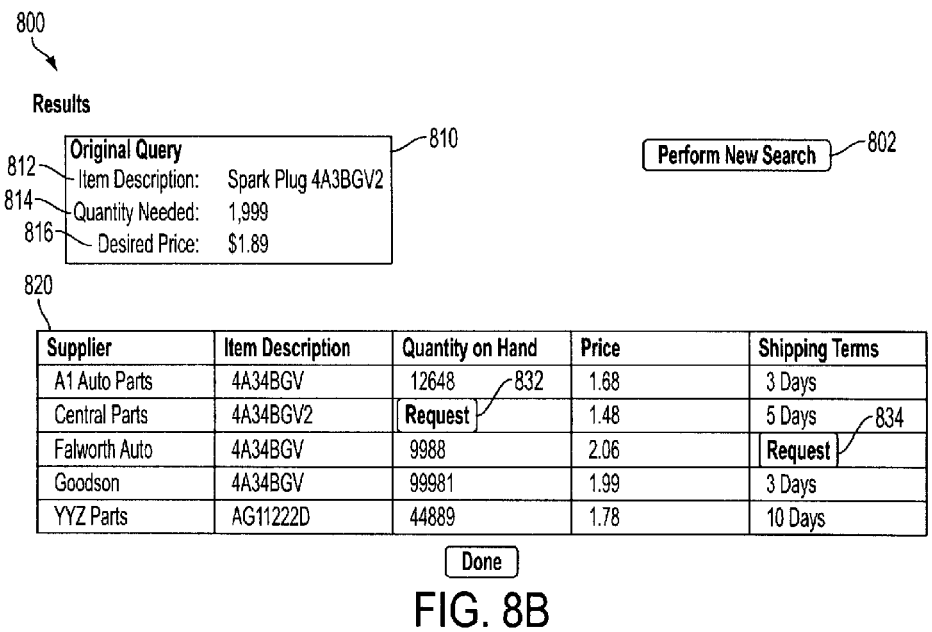
FIG. 8B depicts an exemplary result window for display of query results when a particular query parameter is not returned by a remote application implemented in accordance with disclosed embodiments.

When processing results from the remote applications, there exists a possibility that a field is not present in the result. For example, the quantity column may not be present in the result. FIG. 8B depicts an exemplary result window 800 for display of query results when a particular query parameter is not returned by a remote application implemented in accordance with disclosed embodiments.

In the depicted example, the results from the Central Parts supplier do not have a "Quantity on Hand" element, and results from the Falworth Auto supplier do not include a "Shipping Terms" element. "Request" buttons 832 and 834 may be displayed for each of the elements that were not returned in the result. These buttons allow the user to request the missing data from the supplier, giving the supplier the opportunity to interact with the user and provide any additional missing information that was not present in the results provided to the user. Although not depicted, a "Request All" button may also be displayed that provides the user with the ability to select one button to request missing data from any number of suppliers.

Figure 9:
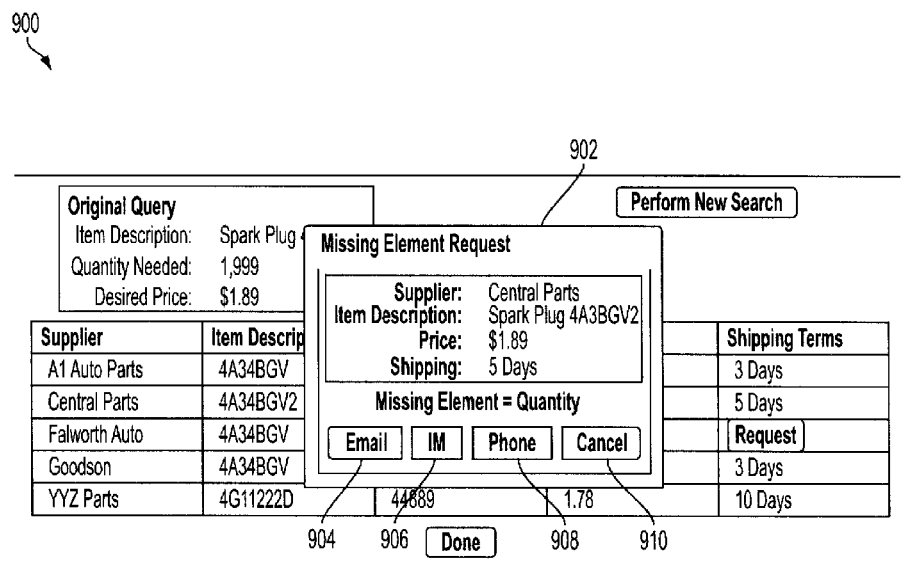
FIG. 9 depicts a popup window displayed when a Request button is selected by a user for a missing "Quantity on Hand" element associated with a supplier in accordance with an embodiment.

FIG. 9 depicts a popup window 900 displayed when the "Request" button 832 is selected by the user for the missing "Quantity on Hand" element associated with the Central Parts supplier. In accordance with an embodiment, by selecting the Request button 832, the user is enabled to interact with the supplier in ways that are not facilitated by traditional web services. In existing applications, when results are returned to the user with incomplete fields, no mechanism exists for the user to readily obtain further information from the remote company unless it is performed externally from the querying application.

In accordance with disclosed embodiments, upon selection of the Request button 832, the pop up window 900 is displayed that includes a missing element request box 902 that specifies the requested missing element for which the user is making a request (e.g., "Missing Element=Quantity"). The pop up window 900 may include various user selectable controls that allow the user to select a mechanism for issuing a request for the missing element. In the illustrative example, the user may issue a request for the missing element by email by way of selecting the email button 904, by an instant message by way of selecting the IM button 906, or by a phone call by way of selecting the phone button 908. Alternatively, the user may close the missing element request by selecting the Cancel button 910. In response to issuing a missing element request, a response provided by the remote supplier may be displayed in a window that displays the successful results of the missing element.

In response to selecting the "Email" button 904, an email is sent to the supplier containing, in an embodiment, a Customer ID which contains information that identifies the customer, such as a customer name, a customer account number, or other information associated with the customer. Further, the email may contain response elements that were obtained from the supplier's database in the original response, and a missing element that specifies the missing information that the customer is requesting.

In response to selecting the "IM" button 906, an IM chat window may be invoked with the supplier thereby allowing the customer to chat with a supplier's representative.

In response to selecting the "Phone" button 908, a phone number of the supplier may be displayed to the user or, if enabled, a voice call may be initiated through the current application. Selection of the "Cancel" button 910 results in closing the Missing Element Request popup window 900.

Mechanisms of communication may be configured via configuration screens in accordance with disclosed embodiments, and the types of communication may be implemented as any of the mechanism described herein, or any other suitable communication routines without departing from the scope of the disclosed embodiments. Regardless of the specific communication mechanism chosen for the implementation, the data network 102, such as the Internet, and/or the cellular network 118, may be utilized for transmission of the communication with the external system.

Thus, in accordance with disclosed embodiments, the query application may configure email, IM, telephony functionality, or other communication mechanisms by incorporating either external third party applications or developing and integrating custom developed software.

Email integration is somewhat less complicated that other communication mechanisms as it is not considered a real-time functionality. Email may be integrated by including a form where the "To" field is automatically determined by the application's setup configuration beforehand, and the form is filled out by the user. The email itself may then be submitted by the user selection of a "Submit" button. As mentioned above, any other information may be automatically supplied to the user when creating the email.

IM integration requires open two-way communication. At the application's setup configuration, the chat ID of the person at the supplier remote end may be configured such that when the IM functionality is invoked by the user of the application, the chat program will be invoked with the remote user automatically notified.

Phone integration may be implemented by simply having a phone contact number which was supplied at the application's setup configuration and which is then displayed to the user upon selection of the Phone button 908. In another embodiment, a voice call may be initiated upon selection of the Phone button 908 using, for example, voice over IP (VoIP) technology or via the cellular network 118 whereby the called number is determined at the application's setup configuration. Further, any of the mechanisms of communication may be implemented sequentially or, alternatively, asynchronously.

In accordance with another embodiment, mechanisms are provided that allow the user to specify automatic product order parameters. These parameters are utilized to automatically place an order at a remote vendor site if a query result falls within bounds of the automatic order parameters.

Figures 10A, 10B, 10C:
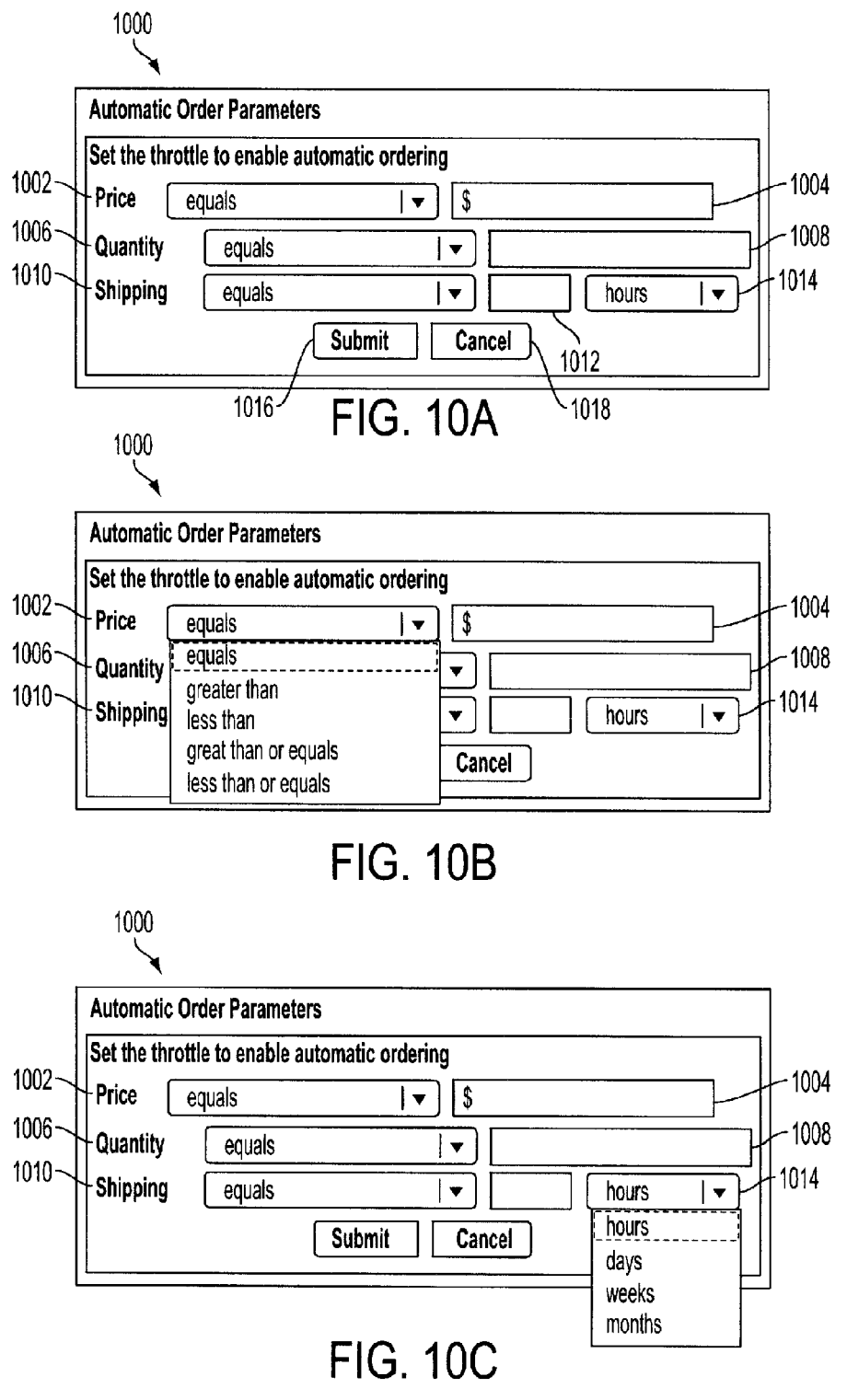

FIG. 10A depicts a diagrammatic representation of a product order GUI 1000 that facilitates automated ordering of desired products implemented in accordance with disclosed embodiments.

The product order GUI 1000 allows automatic order parameters to be set on a particular supplier and item. The order GUI may be displayed to the user at the application's setup configuration where the user can configure the parameters to enable the item to be automatically ordered if query results of a product search are within the set parameters. The configuration allows the user to setup shipping terms, as well as payment options that will be utilized when automatically ordering an item.

The correspondence for the automatic ordering is implemented either by configuration of a particular Web Service, or may also be implemented as having an email sent to the ordering department which may be predetermined at the application's setup configuration. If a Web Service is utilized for the automatic ordering, the parameters of the order will be determined by the values in the application's setup configuration for the automatic ordering.

The automatic product order GUI 1000 includes various controls that facilitate specification of order parameters. In the illustrative example, the product order GUI includes a price drop down menu 1002 that allows the user to select a price equality constraint, e.g., equals, less than, or greater than, that specifies an equality condition for a price entered by the user in an associated price textbox 1004. For example, FIG. 10B depicts a diagrammatic representation of the product order GUI with the menu items of the price drop down menu 1002 displayed responsive to the user selecting the price drop down menu 1002. The product order GUI 1000 may additionally include a quantity down menu 1006 that allows the user to select a quantity equality constraint, e.g., equals, less than, or greater than, that specifies an equality condition for a quantity value entered by the user in an associated quantity textbox 1004. Further, the product order GUI 1000 may additionally include a shipping drop down menu 1010 that allows the user to select a shipping equality constraint, e.g., equals, less than, or greater than, that specifies an equality condition for a shipping constraint entered by the user in an associated shipping textbox 1012. A drop down menu 1014 may further be associated with the shipping textbox 1012 that specifies the time unit, e.g., hours, days, etc., of the shipping constraint entered in the text box 1012. For example, FIG. 10C depicts a diagrammatic representation of the product order GUI with the menu items of the time unit drop down menu 1014 displayed responsive to the user selecting the time unit drop down menu 1014. The GUI 1000 may include a Submit button 1016 that allows the user to submit the automated product order request specified by the data entered into the GUI 1000 and a Cancel button 1018 that allows the user to cancel the automated product order request. FIG. 10D depicts a diagrammatic representation of the product order GUI 1000 after entry of a product price and corresponding price equality constraint, a product quantity and corresponding quantity equality constraint, and a shipping time and corresponding shipping time equality constraint.

An automatic product order verification popup window may be displayed to the user, e.g., upon selection of the Submit button 1016 of the product order GUI 1000, as depicted by the diagrammatic representation of the verification popup window 1100 of FIG. 11. The verification window 1100 depicts the product order that will be submitted for ordering. To submit the order summarized in the verification window, the user may select the Submit button 1102. Alternatively, the user may cancel the order by selecting the Cancel button 1104.

The current invention provides many improvements over contemporary systems and applications by implementing functionality that make Internet commerce easier and more efficient for the user.

The present invention provides a robust method to enable the user or client to interact with numerous suppliers to determine which supplier (or suppliers) to utilize based on various parameters and in situations where results are incomplete. A user may interact with one or more suppliers using similar or different parameters for each supplier within the same application without having to switch to another external application.

The present invention provides results in a visually appealing and logical manner and automates the ordering of an item if that item is found at a particular supplier within the predefined thresholds setup by the user. In this manner, orders may be submitted at the moment the thresholds are met, and decisions may be made automatically by one or more of the system, the user, or based on an interaction by the user and another individual.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of processing product queries in a network system, comprising:
   providing a graphical user interface at a client data processing system;
   entering, by a user of the client data processing system, parameters associated with a product desired to be ordered by the user in the graphical user interface;
   issuing, by the client data processing system, a query to a plurality of data processing systems of respective product suppliers, wherein the query is derived from the parameters entered by the user;
   receiving, by the client data processing system, results of the query issued by the plurality of supplier data processing systems;
   organizing, by the client data processing system, the results in a descending ordered display with at least a portion of the results matching the parameters at the top of the descending ordered display and the remaining results not matching the parameters at the bottom of the descending ordered display;
   wherein the remaining results are further organized into an additional display portion with a request control for an additional query to retrieve additional results for the parameter not included in the results;
   displaying, by the client data processing system, the request control for the additional query in a graphical user interface in association with the parameter that did not match the results; and
   wherein the request control comprises a plurality of controls that each allow selection of a communication mechanism for an additional request of the parameter that did not match the results.

2. The method of claim 1, further comprising determining that the parameters are satisfied by a first product supplier of the product suppliers.

3. The method of claim 2, further comprising responsive to determining that the parameters are satisfied by the first product supplier, ordering the product from the first product supplier.

4. The method of claim 1, wherein one or more of the parameters includes a respective equality condition associated therewith.

5. The method of claim 4, wherein the respective equality condition comprises at least one of an equality condition applied to a product price, a product quantity, and a shipping delivery duration.

6. A non-transitory computer-readable storage medium having computer-executable instructions for execution by a processor included in a processing system, the computer-executable instructions for processing product queries in a network system, the instructions, when executed by the processing system, cause the processor to:
   provide a graphical user interface at a client data processing system;
   receive parameters associated with a product desired to be ordered by a user in the graphical user interface, wherein at least one or more of the parameters includes a respective equality condition associated therewith;
   issue, by the client data processing system, a query to a plurality of data processing systems of respective product suppliers, wherein the query is derived from the parameters;
   receive, by the client data processing system, results of the query issued by the plurality of supplier data processing systems; and
   organize, by the client data processing system, the results according to results in a descending ordered display with at least a portion of the results matching the parameters at the top of the descending ordered display and the remaining results not matching the parameters at the bottom of the descending ordered display;
   wherein the remaining results are further organized into an additional display portion with a request control for an additional query to retrieve additional results for the parameter not included in the results;
   display, by the client data processing system, the request control for the additional query in a graphical user interface in association with the parameter that does not match the results; and
   wherein the request control comprises a plurality of controls that each allow selection of a communication mechanism for an additional request of the parameter that did not match the results.

7. The non-transitory computer-readable storage medium of claim 6, further comprising instructions that, when executed, cause the processing system to determine that the parameters are satisfied by a first product supplier of the product suppliers.

8. The non-transitory computer-readable storage medium of claim 7, further comprising instructions that, when executed, cause the processing system to order the product from the first product supplier responsive to determining that the parameters are satisfied by the first product supplier.

9. The non-transitory computer-readable storage medium of claim 6, wherein the respective equality condition comprises at least one of an equality condition applied to a product price, a product quantity, and a shipping delivery duration.

10. A system for processing product queries, comprising:
    a network system;
    a client data processing system communicatively coupled with the network system; and
    a plurality of product supplier data processing systems communicatively coupled with the network system, wherein the client data processing system provides a graphical user interface for entry of parameters associated with a product desired to be ordered, wherein at least one or more of the parameters includes a respective equality condition associated therewith, wherein the client data processing system issues a query to the plurality of product supplier data processing systems that is derived from the parameters entered, receives results of the query issued by the plurality of supplier data processing systems, and organizes the results in a descending ordered display with at least a portion of the results matching the parameters at the top of the descending ordered display and the remaining results not matching the parameters at the bottom of the descending ordered display, wherein the remaining results are further organized into an additional display portion with a request control for an additional query to retrieve additional results for the parameter not included in the results;
    wherein the client data processing system displays the request control for the additional query in a graphical user interface in association with the parameter that did not match the results; and wherein the request control comprises a plurality of controls that each allow selection of a communication mechanism for an additional request of the parameter that did not match the results.

11. The system of claim 10, wherein the client data processing system determines that the parameters are satisfied by a first product supplier of the product suppliers.

12. The system of claim 11, wherein the product is ordered from the first product supplier responsive to determining that the parameters are satisfied by the first product supplier.

13. The system of claim 10, wherein the respective equality condition comprises at least one of an equality condition applied to a product price, a product quantity, and a shipping delivery duration.

14. The system of claim 10, wherein a result associated with a parameter is not included in the results of the query, and the client data processing system displays a request control in a graphical user interface in association with the parameter that is not included in the results.

* * * * *